(12) United States Patent
Kang et al.

(10) Patent No.: US 9,360,728 B2
(45) Date of Patent: Jun. 7, 2016

(54) LIQUID CRYSTAL DISPLAY PANEL AND METHOD OF MANUFACTURING THE SAME

(71) Applicant: Samsung Display Co., Ltd., Yongin, Gyeonggi-Do (KR)

(72) Inventors: Hyun Ho Kang, Ansan-si (KR); Eun Kil Park, Cheonan-si (KR); Hyung June Kim, Anyang-si (KR); O Sung Seo, Seoul (KR); Tae Kyung Yim, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 58 days.

(21) Appl. No.: 14/513,088

(22) Filed: Oct. 13, 2014

(65) Prior Publication Data

US 2015/0138470 A1 May 21, 2015

(30) Foreign Application Priority Data

Nov. 19, 2013 (KR) .................. 10-2013-0140670

(51) Int. Cl.

| | | |
|---|---|---|
| *G02F 1/1345* | (2006.01) | |
| *G02F 1/1339* | (2006.01) | |
| *G02F 1/136* | (2006.01) | |
| *G02F 1/1368* | (2006.01) | |
| *G02F 1/1333* | (2006.01) | |
| *G02F 1/1335* | (2006.01) | |

(52) U.S. Cl.
CPC ........ *G02F 1/1368* (2013.01); *G02F 1/133308* (2013.01); *G02F 1/133512* (2013.01); *G02F 2001/13685* (2013.01); *G02F 2201/086* (2013.01)

(58) Field of Classification Search
CPC .............. G02F 1/13452; G02F 1/1345; G02F 1/13458; G02F 1/1339; G02F 1/1341; G02F 2001/13415; G02F 1/1368; G02F 1/136213; H05K 3/361; H05K 3/323; H01L 27/12
USPC .......................... 349/42, 149, 153, 154, 190
See application file for complete search history.

(56) References Cited

U.S. PATENT DOCUMENTS

| | | | | |
|---|---|---|---|---|
| 9,213,201 | B2* | 12/2015 | Jung | G02F 1/133723 |
| 2003/0122989 | A1* | 7/2003 | Park | G02F 1/13458 |
| | | | | 349/43 |
| 2007/0097306 | A1* | 5/2007 | Jung | G02F 1/1345 |
| | | | | 349/143 |
| 2008/0036956 | A1* | 2/2008 | Tung | G02F 1/1345 |
| | | | | 349/149 |
| 2013/0141408 | A1 | 6/2013 | Kou | |

(Continued)

FOREIGN PATENT DOCUMENTS

| | | |
|---|---|---|
| JP | 2007-226205 A | 9/2007 |
| KR | 10-2002-0044293 A | 6/2002 |

(Continued)

*Primary Examiner* — Mike Qi
(74) *Attorney, Agent, or Firm* — Innovation Counsel LLP

(57) ABSTRACT

A liquid crystal display panel is provided. The liquid crystal display panel includes a first substrate comprising a pixel area and a non-pixel area surrounding the pixel area, a thin-film transistor (TFT) disposed on the pixel area of the first substrate and a pixel electrode connected to the TFT, and a plurality of metal wirings disposed on the non-pixel area of the first substrate and one or more dummy patterns disposed adjacent to the metal wirings. The TFT includes a gate electrode, a source electrode, and a drain electrode, and the dummy patterns are formed of a same material as at least one of the gate source, the source electrode, and the drain electrode.

20 Claims, 17 Drawing Sheets

(56) References Cited

U.S. PATENT DOCUMENTS

2013/0169919 A1* 7/2013 Hong ................ G02F 1/133788
 349/188
2014/0354924 A1* 12/2014 Byun ................ G02F 1/133514
 349/106

FOREIGN PATENT DOCUMENTS

| KR | 10-2007-0002145 A | 1/2007 |
| KR | 10-2008-0074593 A | 8/2008 |
| KR | 10-2011-0068171 A | 6/2011 |
| KR | 10-2013-0030975 A | 3/2013 |

* cited by examiner

LIQUID CRYSTAL DISPLAY PANEL AND METHOD OF MANUFACTURING THE SAME

This application claims priority from Korean Patent Application No. 10-2013-0140670 filed on Nov. 19, 2013 in the Korean Intellectual Property Office, the disclosure of which is incorporated herein by reference in its entirety.

BACKGROUND

1. Technical Field

The present disclosure relates to a liquid crystal display panel and a method of manufacturing the same.

2. Description of the Related Art

A liquid crystal display (LCD) typically includes a liquid crystal layer interposed between two transparent substrates. The LCD can display a desired image by controlling the light transmittance of each pixel according to the alignment of the liquid crystal layer.

Currently, LCD products are not only rated on performance characteristics (such as image quality, response speed, and contrast ratio), but are also rated on aesthetic factors (relating to the appearance of the LCD). For example, the value of an LCD product can be increased by reducing a width of a bezel covering the edges of the LCD.

To obtain an LCD having a narrow bezel, it may be necessary to reduce a width of an edge area (i.e., a non-pixel area) of a liquid crystal display panel where no image is displayed. However, a black matrix for preventing leakage of light is usually formed on a portion of a first substrate located in the non-pixel area of the liquid crystal display panel. In addition, a plurality of metal wirings for delivering signals are usually formed on a portion of a second substrate located in the non-pixel area of the liquid crystal display panel and facing the first substrate. The first and second substrates may be bonded together using a sealant disposed in the non-pixel area of the liquid crystal display panel. Also, the liquid crystal layer may contain additives. In some instances, light may be irradiated onto the sealant and the liquid crystal layer to cause photocuring or photoreaction of the sealant and additives to take place. The light is typically irradiated onto the sealant and the liquid crystal layer through slits formed between metal wirings on the first and second substrates.

If the slits are too narrow, insufficient light may be irradiated onto the sealant and the liquid crystal layer, thus causing incomplete photocuring or photoreaction of the sealant and additives. As a result, the photoinitiators in the uncured sealant or the unreacted additives in the liquid crystal layer can affect the liquid crystal layer in a pixel area where images are displayed. In particular, if a distance between the sealant and the pixel area is too short in a liquid crystal display panel having a narrow bezel, the photoinitiators in the uncured sealant or the unreacted additives in the liquid crystal layer can affect the liquid crystal layer in the pixel area and form stains on the edges of the liquid crystal display panel.

SUMMARY

The present disclosure is directed to address at least the above issues arising from the incomplete photocuring or photoreaction of sealant and additives in a liquid crystal display panel having a narrow bezel.

According to some embodiments of the inventive concept, a liquid crystal display panel is provided. The liquid crystal display panel includes a first substrate comprising a pixel area and a non-pixel area surrounding the pixel area; a thin-film transistor (TFT) disposed on the pixel area of the first substrate and a pixel electrode connected to the TFT; and a plurality of metal wirings disposed on the non-pixel area of the first substrate and one or more dummy patterns disposed adjacent to the metal wirings, wherein the TFT comprises a gate electrode, a source electrode, and a drain electrode, and the dummy patterns are formed of a same material as at least one of the gate source, the source electrode, and the drain electrode.

In some embodiments, the dummy patterns may be disposed on portions of the non-pixel area where the metal wirings are not disposed.

In some embodiments, the dummy patterns may be electrically floating.

In some embodiments, each of the dummy patterns may be disposed between adjacent metal wirings.

In some embodiments, the dummy patterns may be disposed on a same layer as the gate electrode, the source electrode, or the drain electrode.

In some embodiments, the dummy patterns may be formed of a same material as the metal wirings.

In some embodiments, the liquid crystal display panel may further include a second substrate facing the first substrate; a black matrix disposed on the second substrate; an overcoat layer disposed on the black matrix; and a common electrode disposed on the overcoat layer, wherein the black matrix may be disposed on an area of the second substrate corresponding to the pixel area.

In some embodiments, the liquid crystal display panel may further include a sealant disposed on the non-pixel area for bonding the first substrate and the second substrate together, wherein the metal wirings and at least one of the dummy patterns may overlap the sealant.

In some embodiments, the liquid crystal display panel may further include a liquid crystal layer interposed between the pixel electrode and the common electrode, wherein the liquid crystal layer may include liquid crystal molecules and reactive monomers.

In some embodiments, the liquid crystal display panel may further include a first alignment layer interposed between the pixel electrode and the liquid crystal layer; and a second alignment layer interposed between the common electrode and the liquid crystal layer, wherein the reactive monomers may be disposed directly on the first alignment layer or the second alignment layer.

In some embodiments, the liquid crystal display panel may further include a color filter interposed between the TFT and the pixel electrode, wherein the pixel electrode may be connected to the TFT through a contact hole formed in the color filter.

According to some other embodiments of the inventive concept, a liquid crystal display (LCD) is provided. The LCD includes a liquid crystal display panel comprising a TFT substrate and a counter substrate; and a backlight assembly disposed on an outer surface of a second substrate, the backlight assembly for irradiating light to the liquid crystal display panel, wherein the TFT substrate comprises: a first substrate comprising a pixel area and a non-pixel area surrounding the pixel area, a TFT disposed on the pixel area of the first substrate and a pixel electrode connected to the TFT, and a plurality of metal wirings disposed on the non-pixel area of the first substrate and one or more dummy patterns disposed adjacent to the metal wirings; and wherein the counter substrate comprises: the second substrate, wherein the second substrate faces the first substrate, a black matrix disposed on an inner surface of the second substrate, and a common electrode disposed on the black matrix.

In some embodiments, the dummy patterns may be electrically floating.

In some embodiments, the TFT may include a gate electrode, a source electrode, and a drain electrode, and the dummy patterns may be formed of a same material as at least one of the gate source, the source electrode, and the drain electrode.

In some embodiments, the black matrix may not be formed on an area of the second substrate corresponding to the non-pixel area.

In some embodiments, the liquid crystal display panel may further include a liquid crystal layer interposed between the pixel electrode and the common electrode, the liquid crystal layer comprising liquid crystal molecules and reactive monomers.

According to some further embodiments of the inventive concept, a method of manufacturing a liquid crystal display panel is provided. The method includes forming a TFT and a pixel electrode on a pixel area of a first substrate, wherein the pixel electrode is connected to the TFT; and forming, on a non-pixel area surrounding the pixel area of the first substrate, a plurality of metal wirings and one or more dummy patterns adjacent to the metal wirings, wherein the TFT comprises a gate electrode, a source electrode, and a drain electrode, and the dummy patterns are formed at a same time as at least one of the gate source, the source electrode, and the drain electrode.

In some embodiments, the method may further include forming a black matrix on a second substrate; and bonding the first substrate and the second substrate together by disposing a sealant and a liquid crystal layer between the first substrate and the second substrate, wherein the black matrix may be located on an area of the second substrate corresponding to the pixel area.

In some embodiments, the method may further include irradiating light onto the sealant and the liquid crystal layer through the second substrate after the bonding of the first substrate and the second substrate.

In some embodiments, the liquid crystal layer may include liquid crystal molecules and reactive monomers.

BRIEF DESCRIPTION OF THE DRAWINGS

The above and other aspects and features of the inventive concept will be more apparent when described in detail with reference to the attached drawings.

DETAILED DESCRIPTION

Figure 1:
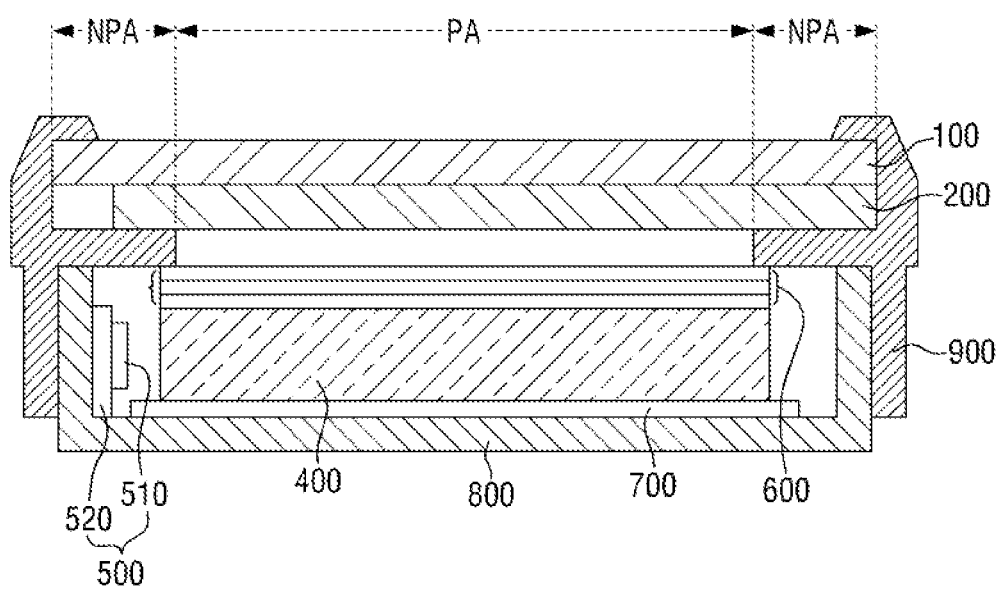
FIG. 1 is a schematic cross-sectional view of a liquid crystal display (LCD) according to an embodiment of the inventive concept.

The various aspects and features of the inventive concept will be apparent with reference to the following embodiments described in the specification. However, the inventive concept is not limited to the embodiments disclosed herein, but can be implemented in different ways.

In the drawings, the thickness of layers, films, panels, regions, etc., may be exaggerated for clarity. It will be understood that when a layer is referred to as being "on" another layer or substrate, it can be disposed directly on the other layer or substrate, or with one or more intervening layers or substrates being present. Like reference numerals designate like elements throughout the specification.

Although the terms "first," "second," and so forth are used to describe constituent elements, the constituent elements are not limited by those terms. Instead, the terms are merely used to distinguish a constituent element from other constituent elements. Accordingly, in the following description, a first constituent element may also correspond to a second constituent element in other contexts.

Figure 2:
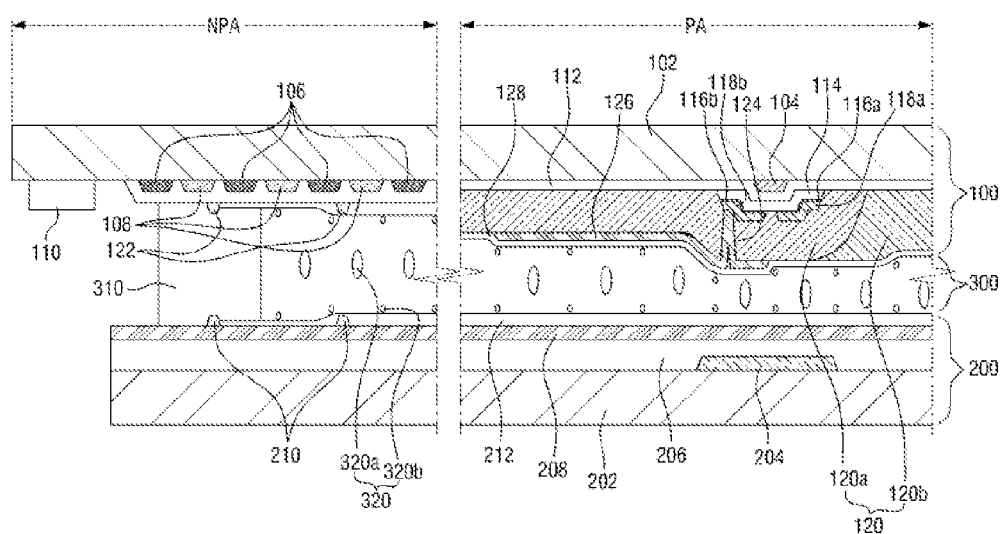
FIG. 2 is an enlarged cross-sectional view of the liquid crystal display panel of FIG. 1.

FIG. 1 is a schematic cross-sectional view of a liquid crystal display (LCD) according to an embodiment of the inventive concept. Referring to FIG. 1, the LCD may include a liquid crystal panel, a backlight assembly, and a fixing member. FIG. 2 illustrates an enlarged cross-sectional view of the liquid crystal display panel of FIG. 1.

Referring to FIGS. 1 and 2, the liquid crystal panel may include a thin-film transistor (TFT) substrate 100, a counter substrate 200, and an intervening layer 300.

The TFT substrate 100 may include a plurality of TFTs and a pixel electrode 126. The TFT substrate 100 may also include a pixel area PA in the middle of the TFT substrate 100 and a non-pixel area NPA surrounding the pixel area PA. A plurality of pixels may be located in the pixel area PA. In contrast, no pixels may be located in the non-pixel area NPA.

The counter substrate 200 may be disposed facing the TFT substrate 100. As shown in FIG. 2, the counter substrate 200 may be located under the TFT substrate 100. The counter substrate 200 may include a black matrix 204 and a common electrode 208. In some embodiments, the counter substrate 200 may be smaller than the TFT substrate 100. Accordingly, the counter substrate 200 may cover a central portion of the TFT substrate 100 while edge portions of the TFT substrate 100 may be exposed.

The intervening layer 300 may be disposed between the TFT substrate 100 and the counter substrate 200. The intervening layer 300 may include a sealant 310 and a liquid crystal layer 320.

Referring back to FIG. 1, the backlight assembly may include a light guide plate (LGP) 400, a light source unit 500, an optical sheet 600, and a reflective plate 700. The backlight assembly is configured to provide light to the liquid crystal display panel, and may be disposed under the liquid crystal display panel.

The LGP 400 may be located under the liquid crystal display panel. In an exemplary embodiment, the LGP 400 may be disposed under the counter substrate 200 with a predetermined gap therebetween. The LGP 400 may guide light (that is emitted from the light source unit 500) toward the liquid crystal display panel.

The light source unit 500 may be located adjacent to the LGP 400. In an exemplary embodiment, the light source unit 500 may be disposed on a side of the LGP 400. However, the inventive concept is not limited thereto. For example, in some other embodiments, the light source unit 500 may be disposed on both sides of the LGP 400 and the backlight assembly may be of an edge-type. In another exemplary embodiment, the light source unit 500 may be disposed under the LGP 400 and the backlight assembly may be of a direct-type. The light source unit 500 may include a light source 510 and a circuit board 520. The light source 510 emits light and may include a light-emitting diode (LED). However, the inventive concept is not limited thereto, and the light source 510 may include any element capable of emitting light. The light source 510 may be mounted on the circuit board 520. The circuit board 520 may be configured to transmit a light source driving signal (received from an external source) to the light source 510.

The optical sheet 600 may be located on the LGP 400. In an exemplary embodiment, the optical sheet 600 may include a plurality of optical sheets and may include at least one diffusion sheet. The optical sheet 600 may modulate light received from the LGP 400 and send the modulated light to the liquid crystal display panel.

The reflective plate 700 may be located under the LGP 400. In a direct-type backlight assembly (in which the light source unit 500 is located under the LGP 400), the reflective plate 700 may be located under the light source unit 500. The reflective plate 700 may include a reflective material and may reflect light traveling through the LGP 400, such that the reflected light is transmitted from the LGP 400.

Referring back to FIG. 1, the fixing member may include a housing 800 and a mold frame 900. The fixing member may surround the liquid crystal display panel and the backlight assembly, and may be used to attach the liquid crystal display panel and the backlight assembly together.

The housing 800 may house the backlight assembly. In an exemplary embodiment, the housing 800 may be formed in a U-shape but is not limited thereto. The housing 800 may include a metallic material with good thermal conductivity. Thus, the housing 800 may transfer heat generated from the backlight assembly to the outside of the liquid crystal display.

The mold frame 900 may be attached to the housing 800 so as to affix both the liquid crystal display panel and the backlight assembly. The mold frame 900 may include a vertical portion parallel to each sidewall of the housing 800 and two horizontal portions protruding perpendicularly from the vertical portion. One of the two horizontal portions may be interposed between the liquid crystal display panel and the backlight assembly, so as to separate the liquid crystal display panel and the backlight assembly by a predetermined distance and to support the liquid crystal display panel. The other one of the two horizontal portions may be disposed directly on an upper edge of the liquid crystal display panel (specifically, on an edge of the TFT substrate 100) to prevent movement of the liquid crystal display panel. That is, the liquid crystal display panel may be interposed between the two horizontal portions of the mold frame 900.

As described above, in some embodiments of the LCD, the counter substrate 200 may be interposed between the TFT substrate 100 and the backlight assembly, and the TFT substrate 100 may extend up to the perimeter of the LCD. Therefore, the backlight assembly can irradiate light onto the liquid crystal display panel from under the counter substrate 200. When the backlight assembly, the counter substrate 200, and the TFT substrate 100 are arranged sequentially in this order, the mold frame 900 can be easily affixed to the liquid crystal display panel. In particular, when fixing a narrow portion of the liquid crystal display panel in the non-pixel area NPA, the horizontal portions of the mold frame 900 can easily affix an edge portion of the TFT substrate 100 that does not overlap the counter substrate 200. Accordingly, the liquid crystal display panel can be fixed in a stable manner, thereby increasing the mechanical stability of the LCD having a narrow bezel.

As previously described with reference to FIG. 2, the liquid crystal display panel may include the TFT substrate 100, the counter substrate 200, and the intervening layer 300.

Referring to FIG. 2, the TFT substrate 100 may include a first substrate 102, a gate electrode 104, a metal wiring 106, a dummy pattern 108, a gate insulating layer 112, a semiconductor pattern 114, a first ohmic contact layer 116a, a second ohmic contact layer 116b, a source electrode 118a, a drain electrode 118b, a color filter 120, a first protruding pattern 122, the pixel electrode 126, and a first alignment layer 128. The TFT substrate 100 may further include a driver 110.

The first substrate 102 may be formed of a transparent insulating material. For example, the first substrate 102 may be formed of rigid glass. However, the inventive concept is not limited thereto. For example, in some other embodiments, the first substrate 102 can be formed of flexible plastic. The first substrate 102 may be shaped like a rectangular parallelepiped plate. However, the inventive concept is not limited thereto, and the first substrate 102 can be formed having various shapes.

The first substrate 102 may include the pixel area PA and the non-pixel area NPA surrounding the pixel area PA. The pixel area PA may correspond to an area where images are displayed, and the non-pixel area NPA may correspond to an area where no image is displayed. In addition, the pixel area PA may correspond to a central area of the first substrate 102, and the non-pixel area NPA may correspond to an edge area of the first substrate 102.

The gate electrode 104 may be located on the pixel area PA of the first substrate 102. The gate electrode 104 may extend from any one of a plurality of gate wirings (not shown). The plurality of gate wirings may extend parallel to each other in a first direction. The gate electrode 104 may receive a gate driving signal from a gate driver (not shown). In an exemplary embodiment, the gate electrode 104 may include a metallic material such as copper (Cu), aluminum (Al), molybdenum (Mo), titanium (Ti) or a combination thereof. In another exemplary embodiment, the gate electrode 104 may have a low-reflective metal stacked structure. The low-reflective metal stacked structure may be, but is not limited to, a stacked structure comprising titanium, indium zinc oxide (IZO), and copper. In another exemplary embodiment, the gate electrode 104 may include an opaque material.

The metal wiring 106 may be located on the non-pixel area NPA of the first substrate 102. The metal wiring 106 may be electrically connected to a driving unit 110. That is, the metal wiring 106 may deliver various driving signals received from the driving unit 110 to various other elements.

The metal wiring 106 may include a plurality of metal wirings separated from each other. Different voltages may be applied to the respective metal wirings 106. Accordingly, the metal wirings 106 may deliver different signals.

The metal wirings 106 may include at least one metal material. In an exemplary embodiment, the metal wirings 106 may include copper, aluminum, molybdenum, titanium or a combination thereof. In another exemplary embodiment, the metal wirings 106 may have a low-reflective metal stacked structure. The low-reflective metal stacked structure may be, but is not limited to, a stacked structure comprising titanium, indium zinc oxide, and copper. In another exemplary embodiment, the metal wirings 106 may include an opaque material. In another exemplary embodiment, the metal wirings 106 may include a same material as the gate electrode 104.

The dummy pattern 108 may be located on the non-pixel area NPA of the first substrate 102. The dummy pattern 108 may include one or more dummy patterns. In an exemplary embodiment, the dummy patterns 108 may be disposed adjacent to the metal wirings 106. For example, the dummy patterns 108 may be located on parts of the non-pixel area NPA where the metal wirings 106 are not located. Accordingly, the dummy patterns 108 may cover parts of the non-pixel area NPA that are not covered by the metal wirings 106. In another example, the dummy patterns 108 may be located between adjacent metal wirings 106. Accordingly, the metal wirings 106 and the dummy patterns 108 may be densely concentrated on the non-pixel area NPA of the first substrate 102. In another exemplary embodiment, the dummy patterns 108 may be electrically floating. That is, no voltages may be applied to the dummy patterns 108.

The dummy patterns 108 may include at least one metal material. In an exemplary embodiment, the dummy patterns 108 may include copper, aluminum, molybdenum, titanium or a combination thereof. In another exemplary embodiment, the dummy patterns 108 may have a low-reflective metal stacked structure. The low-reflective metal stacked structure may be, but is not limited to, a stacked structure comprising titanium, indium zinc oxide, and copper. In another exemplary embodiment, the dummy patterns 108 may include an opaque material. In another exemplary embodiment, the dummy patterns 108 may include a same material as the gate electrode 104. In another exemplary embodiment, the dummy patterns 108 may include a same material as the metal wirings 106. That is, the dummy patterns 108, the metal wirings 106, and the gate electrode 104 may all be formed of a same material. The dummy patterns 108 may be located on a same layer as the gate electrode 104.

Since a plurality of metal wirings 106 and at least one dummy pattern 108 are densely located on the non-pixel area NPA of the first substrate 102 (as described above), it may be possible to prevent light (provided by the backlight assembly) from leaking to the outside at the edge portions of the liquid crystal display panel. In addition, since the metal wirings 106 and/or the dummy patterns 108 overlap the sealant 310, more heat energy can be delivered to the sealant 310 when the sealant 310 is cured by light irradiation.

The gate insulating layer 112 may be formed on the gate electrode 104, the metal wirings 106, and the dummy patterns 108. The gate insulating layer 112 may be located on both the pixel area PA and the non-pixel area NPA of the first substrate 102. The gate insulating layer 112 may include an insulating material such as silicon oxide (SiOx) or silicon nitride (SiNx). The gate insulating layer 112 may have a shape corresponding to a profile formed by the gate electrode 104, the metal wirings 106, and the dummy patterns 108.

The semiconductor pattern 114 may be located on the gate electrode 104. The semiconductor pattern 114 may be located on the pixel area PA of the first substrate 102. The semiconductor pattern 114 may fully cover the gate electrode 104. That is, a central portion of the semiconductor pattern 114 may overlap the gate electrode 104, while edge portions of the semiconductor pattern 114 do not overlap the gate electrode 104. The semiconductor pattern 114 may include, but is not limited to, amorphous silicon, non-crystalline silicon, polycrystalline silicon, or oxide semiconductor.

The first ohmic contact layer 116a may be located on an edge portion of the semiconductor pattern 114 that does not overlap the gate electrode 104. The second ohmic contact layer 116b may be located on the other edge portion of the semiconductor pattern 114 that does not overlap the gate electrode 104, and whereby the edge portions are disposed opposite each other. The first ohmic contact layer 116a and the second ohmic contact layer 116b can reduce contact resistance between the source electrode 118a and the drain electrode 118b.

The source electrode 118a may be located on the first ohmic contact layer 116a. The drain electrode 118b may be located on the second ohmic contact layer 116b. Here, the source electrode 118a may extend from any one of a plurality of data wirings (not shown) that are insulated from (and that intersect with) the gate wirings. In addition, the drain electrode 118b may face the source electrode 118a. The source electrode 118a and the drain electrode 118b may receive data driving signals from a data driver (not shown). In an exemplary embodiment, the source electrode 118a and the drain electrode 118b may include a metallic material such as copper, aluminum, molybdenum, titanium or a combination thereof. In another exemplary embodiment, the source electrode 118a and the drain electrode 118b may have a low-reflective metal stacked structure. The low-reflective metal stacked structure may be, but is not limited to, a stacked structure comprising titanium, indium zinc oxide, and copper. In another exemplary embodiment, the source electrode 118a and the drain electrode 118b may include an opaque material. In another exemplary embodiment, the source electrode 118a and the drain electrode 118b may include a same material as the gate electrode 104.

The gate electrode 104, the semiconductor pattern 114, the source electrode 118a, and the drain electrode 118b collectively form a TFT. The TFT may be located on the pixel area PA of the first substrate 102, and may be configured to perform a switching function of a pixel.

Although not shown in FIG. 2, a passivation layer protecting the TFT may be formed on the TFT. The passivation layer may include an inorganic insulating material.

The color filter 120 may be located on the TFT. The color filter 120 may be located on the pixel area PA of the first substrate 102. The color filter 120 may include an insulating material. In addition, the color filter 120 may modulate the color of light passing through the color filter 120 into a specific color. In an exemplary embodiment, the color filter 120 may include a first color filter 120a and a second color filter 120b. Although not shown in FIG. 2, the color filter 120 may further include a third color filter. The first color filter 120a, the second color filter 120b, and the third color filter may be a red color filter, a green color filter, and a blue color filter, respectively.

The first protruding pattern 122 may be located on the gate insulating layer 112. Specifically, the first protrusion pattern 122 may be formed directly on the gate insulating layer 112 on the non-pixel area NPA of the first substrate 102. The first protruding pattern 122 may include a plurality of first protruding patterns, and the first protruding patterns 122 may define a thickness of the first alignment layer 128 and an area where the first alignment layer 128 is to be coated. At least one of the first protruding patterns 122 may overlap the sealant 310. In addition, the first protruding patterns 122 may be formed of a same material as the color filter 120. For example, the first protruding patterns 122 may be formed of a same material as the blue color filter. However, the inventive concept is not limited thereto. For example, in some embodiments, the first protruding patterns 122 can be formed of a same material as the red or green color filter.

The pixel electrode 126 may be located on the color filter 120. The pixel electrode 126 may be located on the pixel area PA of the first substrate 102. The pixel electrode 126 may be connected to the drain electrode 118b through a contact hole 124 formed in the color filter 120. The pixel electrode 126 may include a transparent conductive material such as indium tin oxide (ITO) or indium zinc oxide (IZO). The pixel electrode 126 may constitute one of a pair of electric field-generating electrodes for applying an electric field to the liquid crystal layer 320.

The first alignment layer 128 may be located on the pixel electrode 126. The first alignment layer 128 may be located on both the pixel area PA and the non-pixel area NPA of the first substrate 102. The first alignment layer 128 may be coated on the first substrate 102 while the first alignment layer 128 is in a liquid state. The thickness of the first alignment layer 128 and the area where the first alignment layer 128 is to be coated may be defined by the first protruding patterns 122. The first alignment layer 128 may directly contact the liquid crystal layer 320 so as to align liquid crystal molecules 320a of the liquid crystal layer 320 in a specific direction.

The driving unit 110 may be located on an edge portion of the first substrate 102 that is not covered by the counter substrate 200. That is, the driving unit 110 may be located on the non-pixel area NPA of the first substrate 102. The driving unit 110 may include the gate driver and the data driver described above. The driving unit 110 may transmit various signals to various driving devices included in the liquid crystal display panel.

All the above-described elements of the TFT substrate 100 may be formed on a bottom surface of the first substrate 102. That is, all the above-described elements of the TFT substrate 100 may be formed on a surface of the first substrate 102 facing the counter substrate 200.

The counter substrate 200 may face the TFT substrate 100. That is, the counter substrate 200 may be located under the TF substrate 100. The counter substrate 200 may include a second substrate 202, the black matrix 204, an overcoat layer 206, the common electrode 208, a second protruding pattern 210, and a second alignment layer 212.

The second substrate 202 may be formed of a transparent insulating material. For example, the second substrate 202 may be formed of rigid glass. However, the inventive concept is not limited thereto. For example, in some other embodiments, the second substrate 202 can be formed of flexible plastic. The second substrate 202 may be shaped like a rectangular parallelepiped plate. However, the inventive concept is not limited thereto, and the second substrate 202 can be formed having various shapes. The shape of the second substrate 202 may correspond to the shape of the first substrate 102, and the material for forming the second substrate 202 may be the same as the material for forming the first substrate 102. In some embodiments, the second substrate 202 may not cover the driving unit 110 formed on the first substrate 102.

The black matrix 204 may include a light-blocking material. The black matrix 204 may be located on the second substrate 202. The black matrix 204 may be located on an area of the second substrate 202 corresponding to the pixel area PA of the first substrate 100. That is, the black matrix 204 may not be formed on an area of the second substrate 202 corresponding to the non-pixel area NPA. Specifically, the black matrix 204 may be formed on an area of the second substrate 202 overlapping the TFT. Although not shown in FIG. 2, the black matrix 204 may have a lattice shape when viewed from above the liquid crystal display panel.

Since the black matrix 204 is formed on the area of the second substrate 202 corresponding to the pixel area PA (but not the non-pixel area NPA), the photoreaction of the sealant 310 and the liquid crystal layer 320 located on the non-pixel area NPA may occur more easily during the manufacture of the liquid crystal display panel.

The overcoat layer 206 may be located on the black matrix 204. The overcoat layer 206 may be located on the areas of the second substrate 202 corresponding to both the pixel area PA and the non-pixel area NPA. The overcoat layer 206 may be formed of a transparent insulating material. In some embodiments, the overcoat layer 206 may be sufficiently thick so as to offset a step difference caused by the black matrix 204.

The common electrode 208 may be located on the overcoat layer 206. The common electrode 208 may be located on the areas of the second substrate 202 corresponding to both the pixel area PA and the non-pixel area NPA. The common electrode 208 may include a transparent conductive material such as indium tin oxide or indium zinc oxide. The common electrode 208 and the pixel electrode 126 form a pair of electric field-generating electrodes that apply an electric field to the liquid crystal layer 320.

The second protruding pattern 210 may be located on the common electrode 208. Specifically, the second protruding pattern 210 may be located directly on a portion of the common electrode 208 corresponding to the non-pixel area NPA. The second protruding pattern 210 include a plurality of second protruding patterns, and the second protruding patterns 210 may define a thickness of the second alignment layer 212 and an area where the second alignment layer 212 is to be coated. Here, at least one of the second protruding patterns 210 may overlap the sealant 310. In addition, the second protruding patterns 210 may be formed of a same material as a column spacer (not shown). The columnar spacer maintains a gap between the TFT substrate 100 and the counter substrate 200.

The second alignment layer 212 may be located on the common electrode 208. The second alignment layer 212 may be located on the areas of the second substrate 202 corresponding to both the pixel area PA and the non-pixel area NPA of the first substrate 102. The second alignment layer 212 may be coated on the second substrate 202 while the second alignment layer 212 is in a liquid state. The thickness of the second alignment layer 212 and the area where the second alignment layer 212 is to be coated may be defined by the second protruding patterns 210. The second alignment layer 212 and the first alignment layer 128 may directly contact the liquid crystal layer 320 so as to align liquid crystal molecules 320a of the liquid crystal layer 320 in a specific direction.

All the above-described elements of the counter substrate 200 may be formed on a top surface of the second substrate 202. That is, all the above-described elements of the counter substrate 200 may be formed on a surface of the second substrate 202 facing the TFT substrate 100. Here, a surface of the second substrate 202 facing the TFT substrate 100 may be referred to as an inner surface, and the other surface of the second substrate 202 opposite the inner surface may be referred to as an outer surface.

The intervening layer 300 may be disposed between the TFT substrate 100 and the counter substrate 200. The intervening layer 300 may include the sealant 310 and the liquid crystal layer 320.

The sealant 310 may be disposed along the edges of the TFT substrate 100 and the counter substrate 200. The sealant 310 may seal the liquid crystal layer 320. Specifically, the sealant 310 may be located on the non-pixel area NPA of the first substrate 102. In an exemplary embodiment, the sealant 310 may overlap the metal wirings 106 and/or the dummy patterns 108. In addition, the sealant 310 may overlap the first protruding patterns 122 and/or the second protruding patterns 210. Also, the sealant 310 may overlap the first alignment layer 128 and/or the second alignment layer 212. The sealant 310 may include a photocurable material. As will be described later in the specification, since sufficient light can be irradiated onto the sealant 310 during the manufacture of the liquid crystal display panel, the sealant 310 can therefore be cured in a stable manner.

The liquid crystal layer 320 may be surrounded by the sealant 310. The liquid crystal layer 320 may be located on both the pixel area PA and the non-pixel area NPA of the first substrate 102. The liquid crystal layer 320 may include the liquid crystal molecules 320a and reactive monomers 320b.

The liquid crystal molecules 320a may be aligned perpendicular to a surface of the first substrate 102 or a surface of the second substrate 202. In addition, the reactive monomers 320b may assist in the alignment of the liquid crystal molecules 320a. The reactive monomers 320b may have photoreactivity. That is, light irradiated onto the reactive monomers 320b may cause the reactive monomers 320b to bond with the first alignment layer 128 or the second alignment layer 212. During the manufacture of the liquid crystal display panel, sufficient light can be irradiated onto the liquid crystal layer 320 located on the pixel area PA and the non-pixel area NPA. Thus, the reactive monomers 320b can be located directly on the first alignment layer 128 and the second alignment layer 212.

In an exemplary embodiments, the liquid crystal display panel may not have a black matrix in the non-pixel area NPA. Thus, during the manufacture of the liquid crystal display panel, the photocuring and photoreaction of the sealant 310 and the reactive monomers 320b located on the non-pixel area NPA may occur more easily, thereby preventing the formation of stains in the non-pixel area NPA. In addition, since the non-pixel area NPA is fully covered by a plurality of metal wirings 106 and at least one dummy pattern 108, the leakage of light in the non-pixel area NPA can be minimized (even without the black matrix).

Next, a method of manufacturing a liquid crystal display panel according to an embodiment of the inventive concept will be described with reference to FIGS. 3 through 15. FIGS. 3 through 15 are cross-sectional views of the liquid crystal display panel of FIG. 1 at different stages of fabrication. For convenience of description, elements substantially identical to those shown in the above-described figures are indicated by the same reference numerals, and thus a detailed description of those elements will be omitted.

First, a method of manufacturing a TFT substrate 100 will be described with reference to FIGS. 3 through 8.

Figure 3:
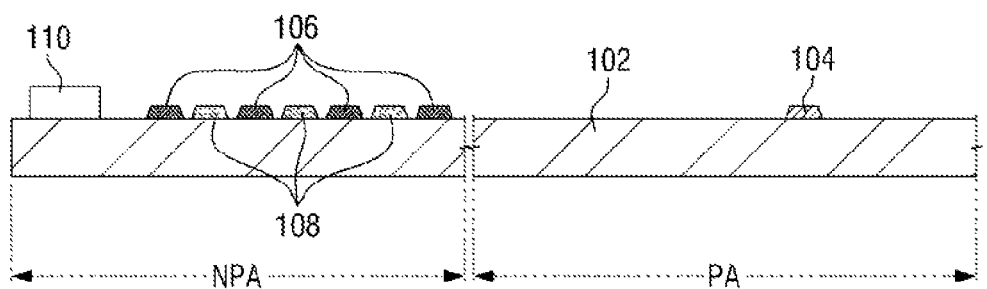
FIGS. 3 through 15 are cross-sectional views illustrating an exemplary method of manufacturing the liquid crystal display panel of FIG. 1.

Referring to FIG. 3, a gate electrode 104, a plurality of metal wirings 106, a plurality of dummy patterns 108, and a driving unit 110 may be formed on a first substrate 102. The gate electrode 104, the metal wirings 106, and the dummy patterns 108 may be formed simultaneously by a same process. Thus, the gate electrode 104, the metal wirings 106, and the dummy patterns 108 may all lie in the same plane.

Figure 4:
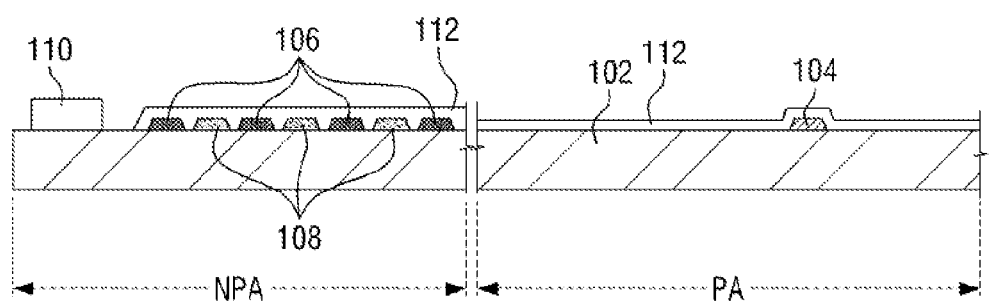

Referring to FIG. 4, a gate insulating layer 112 may be formed on the gate electrode 104, the metal wirings 106, and the dummy patterns 108. The gate insulating layer 112 may be formed using a thin film deposition process.

Figure 5:
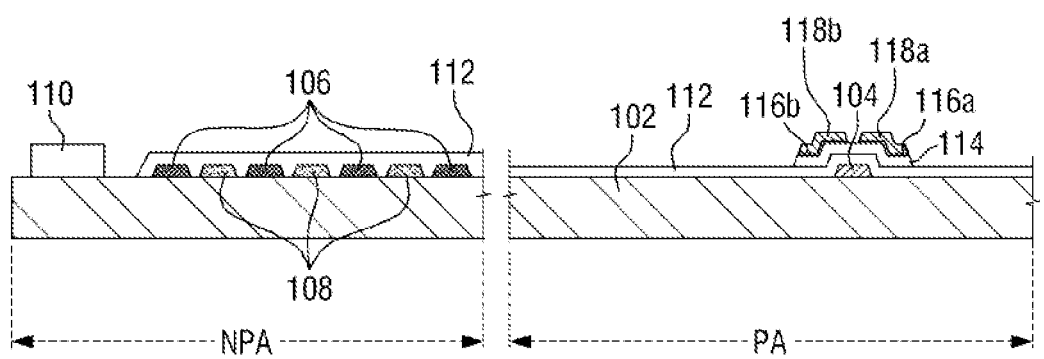

Referring to FIG. 5, a semiconductor pattern 114, a first ohmic contact layer, a second ohmic contact layer, a source electrode 118a, and a drain electrode 118b may be formed on a portion of the gate insulating layer 112 disposed above the gate electrode 104. Here, the semiconductor pattern 114, the first ohmic contact layer, the second ohmic contact layer, the source electrode 118a, and the drain electrode 118b may be patterned at the same time using a single mask. The mask may be a halftone mask. Although not shown in the drawings, a first passivation layer may be subsequently formed on the source electrode 118a and the drain electrode 118b.

Figure 6:
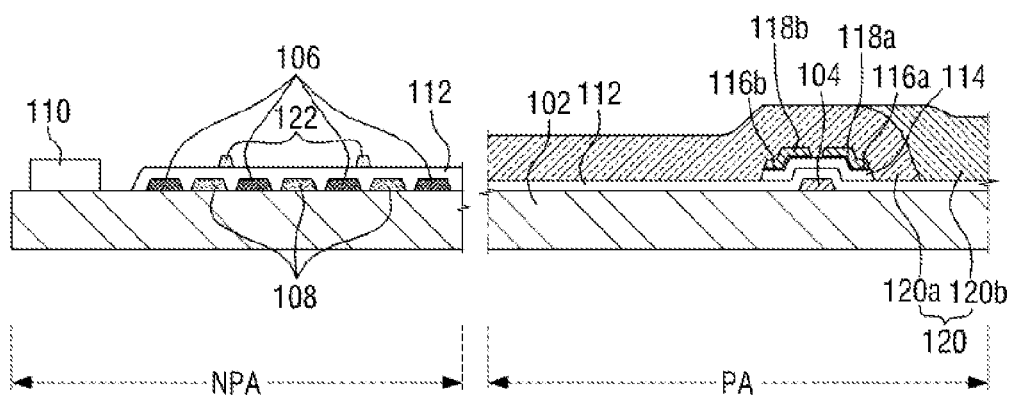

Referring to FIG. 6, a color filter 120 may be formed on a pixel area PA, and a plurality of first protruding patterns 122 may be formed on a non-pixel area NPA. The color filter 120 may include a first color filter 120a and a second color filter 120b. The color filter 120 and the first protruding patterns 122 may be formed simultaneously by a same process. Although not shown in the drawings, a second passivation layer may be subsequently formed on the color filter 120.

Figure 7:
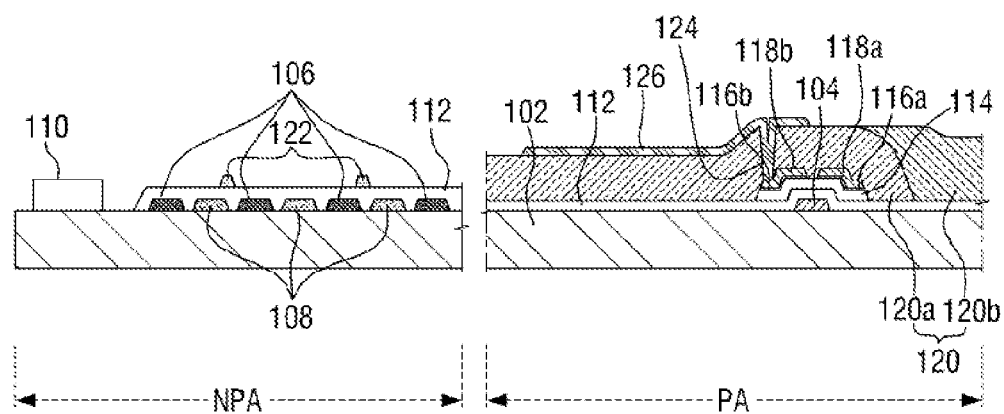

Referring to FIG. 7, a contact hole 124 may be formed in the color filter 120, and a pixel electrode 126 may be formed contacting the drain electrode 118b through the contact hole 124. Here, the pixel electrode 126 may be formed using a fine metal mask (FMM).

Figure 8:
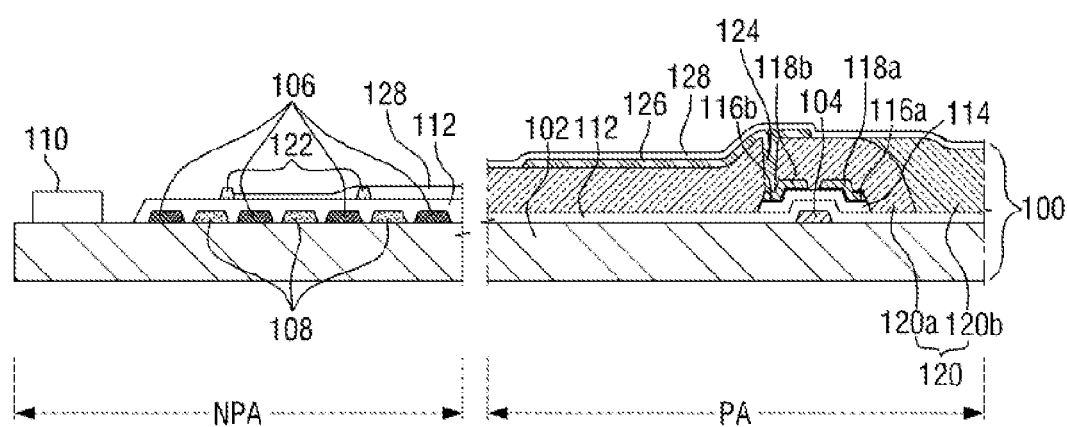

Referring to FIG. 8, an alignment solution is dispensed onto a central portion of the first substrate 102 and then dried to form a first alignment layer 128. Specifically, the layer formed on top of the gate insulating layer 112 in the NPA region is the first alignment layer 128. Here, a total thickness of the first alignment layer 128 may be set by a first protruding pattern 122 adjacent to the pixel area PA, and an area where the first alignment layer 128 is coated may be defined by an outermost first protruding pattern 122.

Next, a method of manufacturing a counter substrate 200 will be described with reference to FIGS. 9 through 13.

Figure 9:
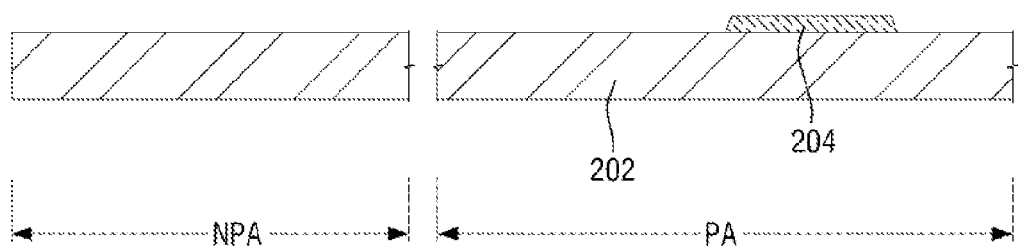

Referring to FIG. 9, a black matrix 204 may be formed on a second substrate 202. Here, the black matrix 204 may be formed on an area of the second substrate 202 corresponding to the pixel area PA. That is, the black matrix 204 may not be formed on an area of the second substrate 202 corresponding to the non-pixel area NPA.

Figure 10:
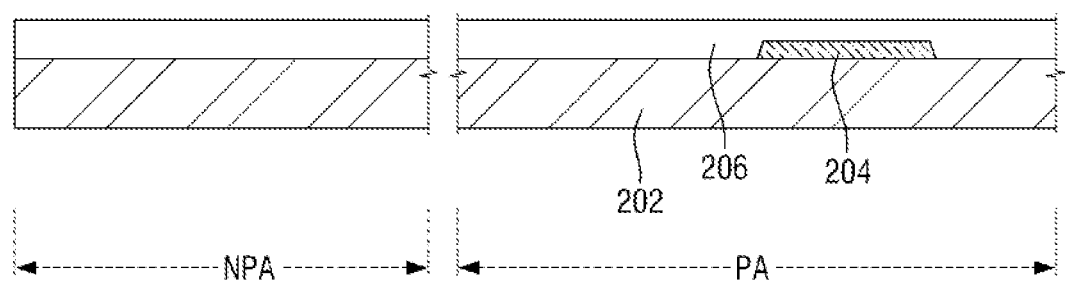

Referring to FIG. 10, an overcoat layer 206 may be formed on the black matrix 204. The overcoat layer 206 may be sufficiently thick so as to cover the black matrix 204. The overcoat layer 206 may be formed having a flat surface.

Figure 11:
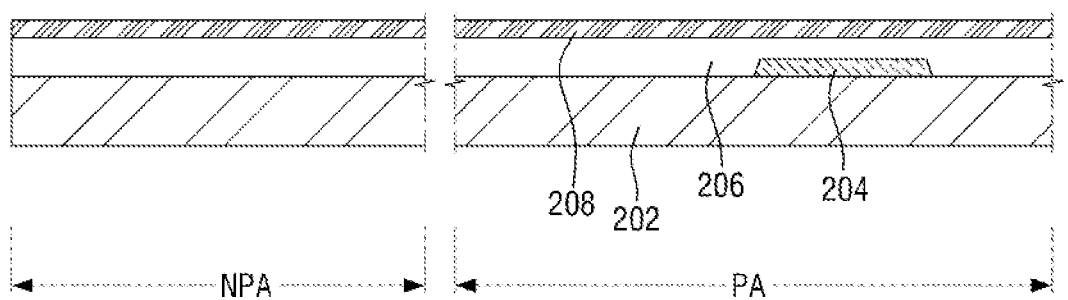

Referring to FIG. 11, a common electrode 208 may be formed on the overcoat layer 206. Unlike the pixel electrode 126, the common electrode 208 does not need to be patterned. Thus, the common electrode 208 may be formed using an open mask.

Figure 12:
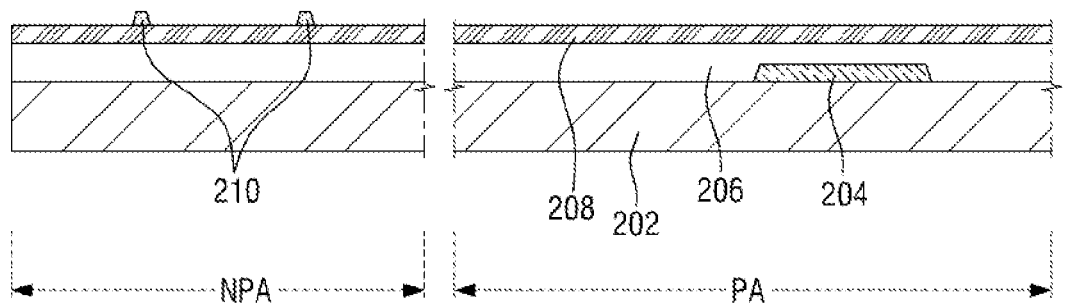

Referring to FIG. 12, a plurality of second protruding patterns 210 may be formed on a portion of the common electrode 208 corresponding to the non-pixel area NPA. Although not shown in the drawings, a column spacer may be formed on a portion of the common electrode 208 corresponding to the pixel area PA or the non-pixel area NPA, so as to maintain a distance between the TFT substrate 100 and the counter substrate 200. The second protruding patterns 210 and the column spacer may be formed simultaneously.

Figure 13:
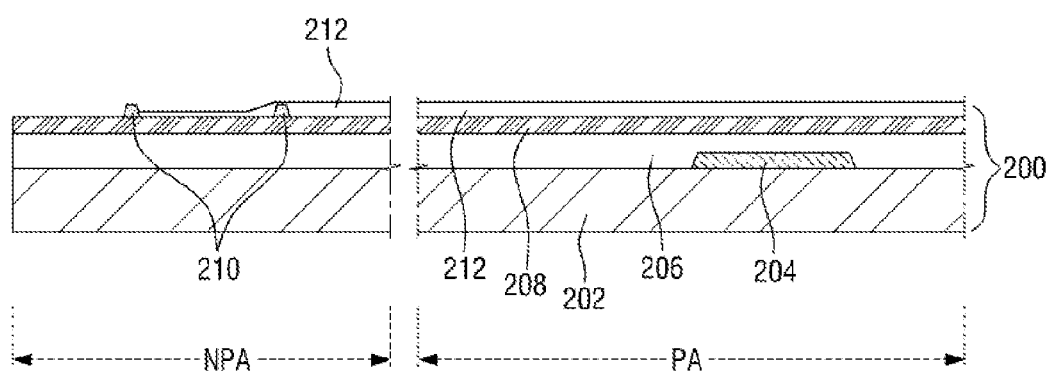

Referring to FIG. 13, an alignment solution is dispensed onto a central portion of the second substrate 202 and then dried to form a second alignment layer 212. Here, a total thickness of the second alignment layer 212 may be set by a second protruding pattern 210 adjacent to the area of the second substrate 202 corresponding to the pixel area PA. An area where the second alignment layer 212 is coated may be defined by an outermost second protruding pattern 210.

Next, a method of bonding the TFT substrate 100 and the counter substrate 200 and a light irradiation process will be described with reference to FIGS. 14 and 15.

Figure 14:
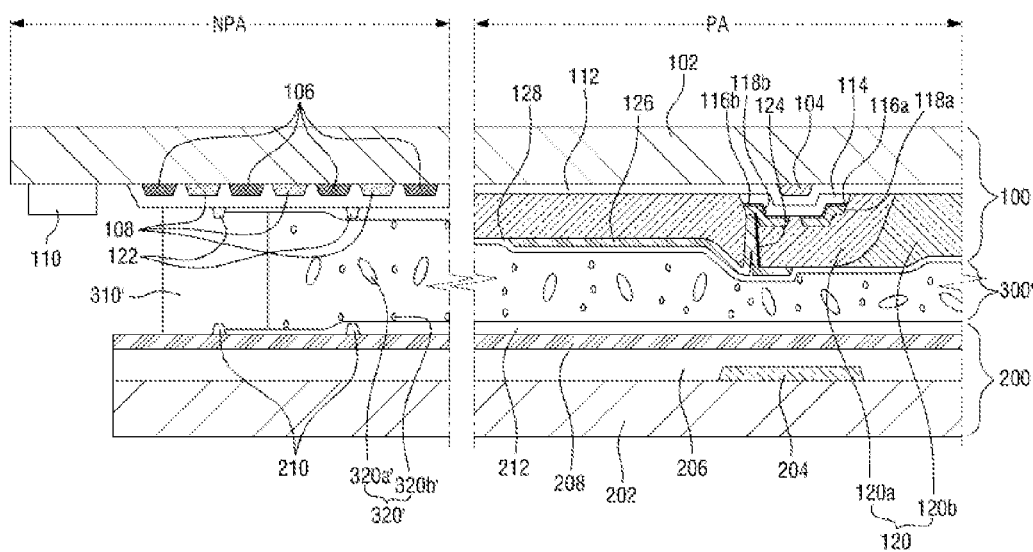

Referring to FIG. 14, an intervening layer 300' may be formed between the TFT substrate 100 and the counter substrate 200. As a result, the TFT substrate 100 and the counter substrate 200 may be bonded together. The intervening layer 300' may include a sealant 310' located on the non-pixel area NPA and a liquid crystal layer 320' surrounded by the sealant 310' and having liquid crystal molecules 320a' and reactive monomers 320b'. Here, the sealant 310' have not yet been cured, and the reactive monomers 320b' (and the unaligned liquid crystal molecules 320') may be distributed randomly within the liquid crystal layer 320'.

Figure 15:
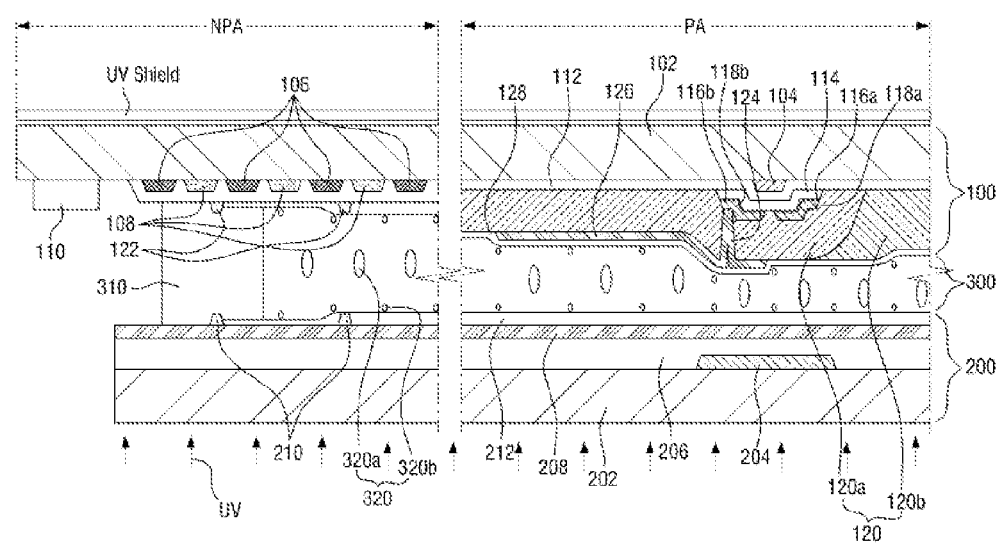

Referring to FIG. 15, light may be irradiated onto an outer surface of the second substrate 202 to cure the sealant 310' in the intervening layer 300' and cause the reactive monomers 320b' in the liquid crystal layer 320' to react, thereby aligning the liquid crystal molecules 320a'. The cured sealant 310', aligned/reacted liquid crystal layer 320', reacted reactive monomers 320b', and aligned liquid crystal molecules 320a' are denoted by the sealant 310, liquid crystal layer 320, reactive monomers 320b, and liquid crystal molecules 320a, respectively, in FIG. 15. Here, the light may be UV light. A UV-blocking layer (UV Shield) may be formed on a top surface of the first substrate 102. Since a black matrix is not formed on the area of the second substrate 202 corresponding to the non-pixel area NPA, irradiated light can thus directly enter the sealant 310 and the liquid crystal layer 320. In addition, since the black matrix 204 is not formed on most of the area of the second substrate 202 corresponding to the pixel area PA, sufficient light can be irradiated onto the liquid crystal layer 320. Furthermore, since the black matrix 204 is formed having a narrow shape on a portion of the second substrate 202 corresponding to a TFT in the pixel area PA, sufficient light can be irradiated onto the liquid crystal layer 320 disposed above the black matrix 204 through, for example, diffraction of irradiated light. Accordingly, the sealant 310 can be cured in a stable manner, and the reactive monomers 320b can be stably placed on the first alignment layer 128 and the second alignment layer 212, thereby preventing the formation of stains on the edges of the liquid crystal display panel.

Figure 16:
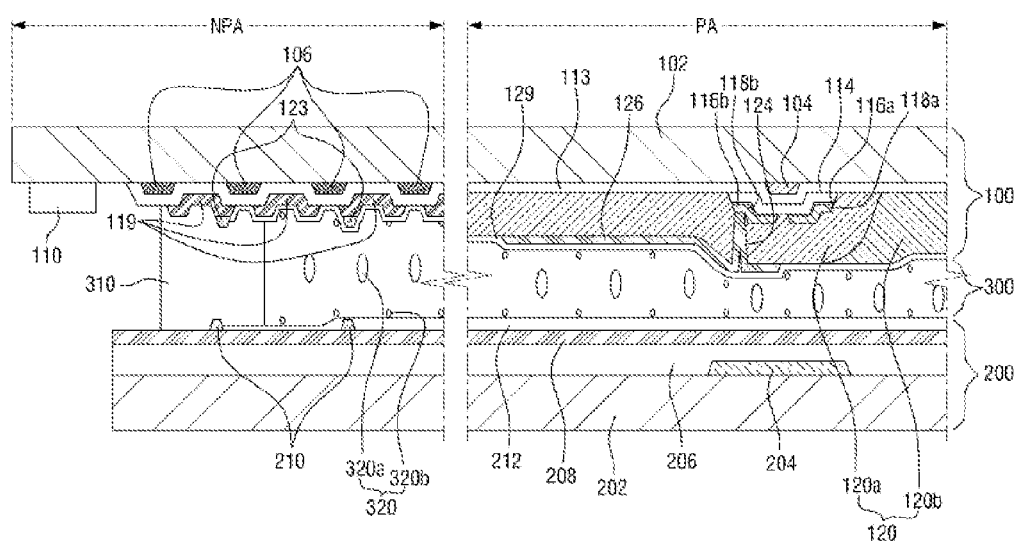
FIG. 16 is an enlarged cross-sectional view of a liquid crystal display panel according to another embodiment of the inventive concept.

FIG. 16 is an enlarged cross-sectional view of a liquid crystal display panel according to another embodiment of the inventive concept. For convenience of description, elements substantially identical to those shown in the above-described figures are indicated by the same reference numerals, and thus a detailed description of those elements will be omitted.

Referring to FIG. 16, a plurality of dummy patterns 119 may be formed of a same material as a source electrode 118a and/or a drain electrode 118b. That is, the dummy patterns 119 may be formed at the same time as the source electrode 118a and the drain electrode 118b. In other words, the dummy patterns 119 may be located on a same layer as the source electrode 118a and the drain electrode 118b. Accordingly, the shapes of a gate insulating layer 113 and a first alignment layer 129 having the dummy patterns 119 interposed therebetween may vary. In addition, a plurality of first protruding patterns 123 may be formed directly on the dummy patterns 119.

Although the dummy patterns 119 and a plurality of metal wirings 106 are formed on different layers, since each of the dummy patterns 119 is located between adjacent metal wirings 106, it is possible to prevent leakage of light in an edge area of the liquid crystal display panel.

Figure 17:
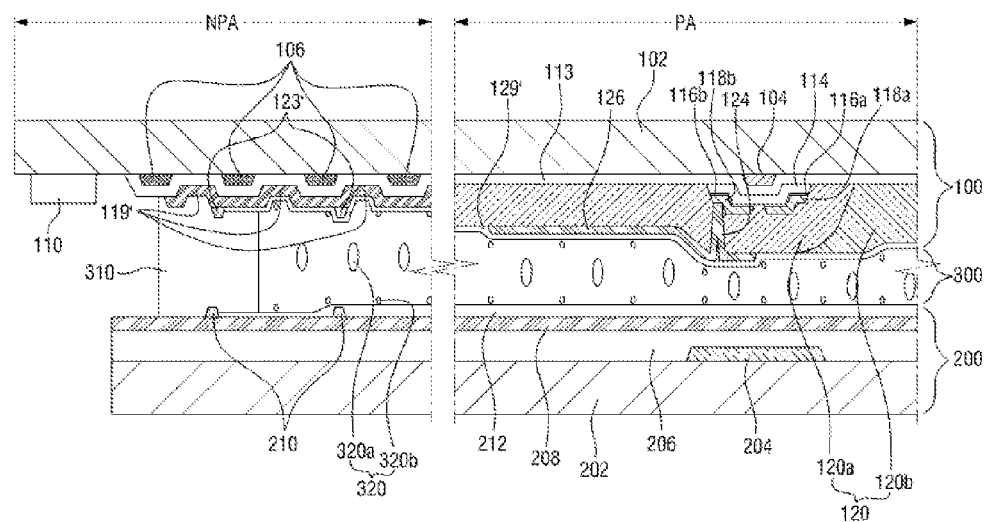
FIG. 17 is an enlarged cross-sectional view of a liquid crystal display panel according to a further embodiment of the inventive concept.

FIG. 17 is an enlarged cross-sectional view of a liquid crystal display panel according to a further embodiment of the inventive concept. For convenience of description, elements substantially identical to those shown in the above-described figures are indicated by the same reference numerals, and thus a detailed description of those elements will be omitted.

Referring to FIG. 17, a dummy pattern 119' may be formed. Accordingly, the shape of a first alignment layer 129' formed on the dummy pattern 119' may vary. In addition, a plurality of first protruding patterns 123' may be formed directly on the dummy pattern 119'.

The dummy pattern 119' is located on a different layer from a plurality of metal wirings 106. A gate insulating layer 113 is located between the dummy pattern 119' and the metal wirings 106. Therefore, even though the dummy pattern 119' may be shaped like a single plate, the dummy pattern 119' will not be electrically connected with the metal wirings 106. Accordingly, leakage of light in an edge area of the liquid crystal display panel can be prevented.

The different embodiments of the inventive concept described above can prevent the formation of stains and leakage of light in a non-pixel area of a liquid crystal display panel.

While the inventive concept has been described with reference to exemplary embodiments, it will be understood by those of ordinary skill in the art that various changes may be made to the different embodiments without departing from the spirit and scope of the inventive concept.

What is claimed is:

1. A liquid crystal display panel comprising:
    a first substrate comprising a pixel area and a non-pixel area surrounding the pixel area;
    a thin-film transistor (TFT) disposed on the pixel area of the first substrate and a pixel electrode connected to the TFT; and
    a plurality of metal wirings disposed on the non-pixel area of the first substrate and one or more dummy patterns disposed adjacent to the metal wirings,
    wherein the TFT comprises a gate electrode, a source electrode, and a drain electrode, and the dummy patterns are formed of a same material as at least one of the gate source, the source electrode, and the drain electrode.

2. The liquid crystal display panel of claim 1, wherein the dummy patterns are disposed on portions of the non-pixel area where the metal wirings are not disposed.

3. The liquid crystal display panel of claim 1, wherein the dummy patterns are electrically floating.

4. The liquid crystal display panel of claim 1, wherein each of the dummy patterns is disposed between adjacent metal wirings.

5. The liquid crystal display panel of claim 1, wherein the dummy patterns are disposed on a same layer as the gate electrode, the source electrode, or the drain electrode.

6. The liquid crystal display panel of claim 1, wherein the dummy patterns are formed of a same material as the metal wirings.

7. The liquid crystal display panel of claim 1, further comprising:
    a second substrate facing the first substrate;
    a black matrix disposed on the second substrate;
    an overcoat layer disposed on the black matrix; and
    a common electrode disposed on the overcoat layer,
    wherein the black matrix is disposed on an area of the second substrate corresponding to the pixel area.

8. The liquid crystal display panel of claim 7, further comprising:
    a sealant disposed on the non-pixel area for bonding the first substrate and the second substrate together, wherein the metal wirings and at least one of the dummy patterns overlap the sealant.

9. The liquid crystal display panel of claim 7, further comprising:
    a liquid crystal layer interposed between the pixel electrode and the common electrode, wherein the liquid crystal layer comprises liquid crystal molecules and reactive monomers.

10. The liquid crystal display panel of claim 9, further comprising:
    a first alignment layer interposed between the pixel electrode and the liquid crystal layer; and
    a second alignment layer interposed between the common electrode and the liquid crystal layer,
    wherein the reactive monomers are disposed directly on the first alignment layer or the second alignment layer.

11. The liquid crystal display panel of claim 1, further comprising:
   a color filter interposed between the TFT and the pixel electrode, wherein the pixel electrode is connected to the TFT through a contact hole formed in the color filter.

12. A liquid crystal display (LCD) comprising:
   a liquid crystal display panel comprising a TFT substrate and a counter substrate; and
   a backlight assembly disposed on an outer surface of a second substrate, the backlight assembly for irradiating light to the liquid crystal display panel,
   wherein the TFT substrate comprises:
      a first substrate comprising a pixel area and a non-pixel area surrounding the pixel area,
      a TFT disposed on the pixel area of the first substrate and a pixel electrode connected to the TFT, and
      a plurality of metal wirings disposed on the non-pixel area of the first substrate and one or more dummy patterns disposed adjacent to the metal wirings; and
   wherein the counter substrate comprises:
      the second substrate, wherein the second substrate faces the first substrate,
      a black matrix disposed on an inner surface of the second substrate, and
      a common electrode disposed on the black matrix.

13. The LCD of claim 12, wherein the dummy patterns are electrically floating.

14. The LCD of claim 12, wherein the TFT comprises a gate electrode, a source electrode, and a drain electrode, and the dummy patterns are formed of a same material as at least one of the gate source, the source electrode, and the drain electrode.

15. The LCD of claim 12, wherein the black matrix is not formed on an area of the second substrate corresponding to the non-pixel area.

16. The LCD of claim 12, wherein the liquid crystal display panel further comprises:
   a liquid crystal layer interposed between the pixel electrode and the common electrode, the liquid crystal layer comprising liquid crystal molecules and reactive monomers.

17. A method of manufacturing a liquid crystal display panel, comprising:
   forming a TFT and a pixel electrode on a pixel area of a first substrate, wherein the pixel electrode is connected to the TFT; and
   forming, on a non-pixel area surrounding the pixel area of the first substrate, a plurality of metal wirings and one or more dummy patterns adjacent to the metal wirings,
   wherein the TFT comprises a gate electrode, a source electrode, and a drain electrode, and the dummy patterns are formed at a same time as at least one of the gate source, the source electrode, and the drain electrode.

18. The method of claim 17, further comprising:
   forming a black matrix on a second substrate; and
   bonding the first substrate and the second substrate together by disposing a sealant and a liquid crystal layer between the first substrate and the second substrate,
   wherein the black matrix is located on an area of the second substrate corresponding to the pixel area.

19. The method of claim 18, further comprising:
   irradiating light onto the sealant and the liquid crystal layer through the second substrate after the bonding of the first substrate and the second substrate.

20. The method of claim 19, wherein the liquid crystal layer comprises liquid crystal molecules and reactive monomers.

* * * * *